United States Patent
Sukhomlinov

(10) Patent No.: US 10,565,984 B2
(45) Date of Patent: Feb. 18, 2020

(54) SYSTEM AND METHOD FOR MAINTAINING SPEECH RECOGNITION DYNAMIC DICTIONARY

(71) Applicant: Intel Corporation, Santa Clara, CA (US)

(72) Inventor: Vadim Sukhomlinov, Moscow (RU)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/359,494

(22) PCT Filed: Nov. 15, 2013

(86) PCT No.: PCT/US2013/070284
§ 371 (c)(1),
(2) Date: May 20, 2014

(87) PCT Pub. No.: WO2015/073019
PCT Pub. Date: May 21, 2015

(65) Prior Publication Data
US 2015/0221300 A1    Aug. 6, 2015

(51) Int. Cl.
*G10L 15/08* (2006.01)
*G10L 15/26* (2006.01)
*G10L 13/00* (2006.01)
*G10L 17/22* (2013.01)

(52) U.S. Cl.
CPC .............. *G10L 15/08* (2013.01); *G10L 13/00* (2013.01); *G10L 15/26* (2013.01); *G10L 17/22* (2013.01)

(58) Field of Classification Search
CPC ..... G06F 17/2735; G06F 17/30; G10L 13/00; G10L 15/08; G10L 15/26; G10L 17/22; G10L 15/18
See application file for complete search history.

(56) References Cited

U.S. PATENT DOCUMENTS

| | | | |
|---|---|---|---|
| 6,434,524 B1 * | 8/2002 | Weber | G06F 3/16 704/257 |
| 7,925,506 B2 * | 4/2011 | Farmaner | G10L 15/193 704/231 |
| 8,015,006 B2 * | 9/2011 | Kennewick | G10L 15/22 704/236 |
| 2003/0014251 A1 | 1/2003 | Pokhariyal et al. | |
| 2003/0191639 A1 | 10/2003 | Mazza | |
| 2004/0128140 A1 | 7/2004 | Deisher | |
| 2007/0033005 A1 * | 2/2007 | Cristo | G06F 17/279 704/9 |
| 2009/0049179 A1 * | 2/2009 | Ehms | G06F 17/30731 709/227 |
| 2010/0076751 A1 * | 3/2010 | Chikuri | G10L 15/22 704/10 |

(Continued)

OTHER PUBLICATIONS

International Search Report and Written Opinion received for PCT Patent Application No. PCT/US2013/070284, dated Aug. 19, 2014, 16 pages.

(Continued)

*Primary Examiner* — Angela A Armstrong
(74) *Attorney, Agent, or Firm* — Jordan IP Law, LLC

(57) ABSTRACT

Techniques related to coding data including techniques for speech recognition using a dynamic dictionary are generally described.

22 Claims, 6 Drawing Sheets

(56) References Cited

U.S. PATENT DOCUMENTS

| | | | |
|---|---|---|---|
| 2010/0204994 A1* | 8/2010 | Kennewick | G10L 15/22 |
| | | | 704/257 |
| 2012/0004909 A1 | 1/2012 | Beltman et al. | |
| 2012/0078611 A1* | 3/2012 | Soltani | G06F 3/167 |
| | | | 704/9 |
| 2012/0150636 A1 | 6/2012 | Freeman et al. | |
| 2012/0239399 A1 | 9/2012 | Yamazaki et al. | |
| 2013/0268673 A1 | 10/2013 | Graham-Cumming | |

OTHER PUBLICATIONS

International Preliminary Report on Patentability received for PCT Patent Application No. PCT/US2013/070284, dated May 26, 2016, 12 pages.

Office Action for Korean Patent Application No. 10-2016-7009388, dated Jun. 20, 2017, 8 pages including 1 page of English translation.

Notice of Preliminary Rejection in KR Application No. 10-2019-7009388 dated Dec. 28, 2017, 6 pages with 1 page of English summary.

\* cited by examiner

SYSTEM AND METHOD FOR MAINTAINING SPEECH RECOGNITION DYNAMIC DICTIONARY

BACKGROUND

In general, speech recognition systems may implement dictionaries to assist with matching the sounds of spoken words to the words themselves. Such dictionaries may contain a relatively large number of entries so that a large variety of spoken words may be identified, but implementation of a complete dictionary containing all possible spoken words is practically impossible. Additionally, use of a dictionary with a relatively large number of entries may increase the likelihood of incorrect identification of spoken words due to the possible presence of a relatively larger number of similar entries. Thus, a relatively smaller dictionary may be valued for promoting relative accuracy, whereas a relatively larger dictionary may be valued for assisting with the identification of a relatively larger variety of spoken words. Currently known speech recognition systems, such as those offered by Nuance Communications, implement static dictionaries and allow application to provide custom dictionaries to improve quality of speech recognition, or, in the case of systems such as Google Voice, implement no dictionary at all. Techniques for speech recognition using a dynamic dictionary are generally disclosed and described herein.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

Figure 1:
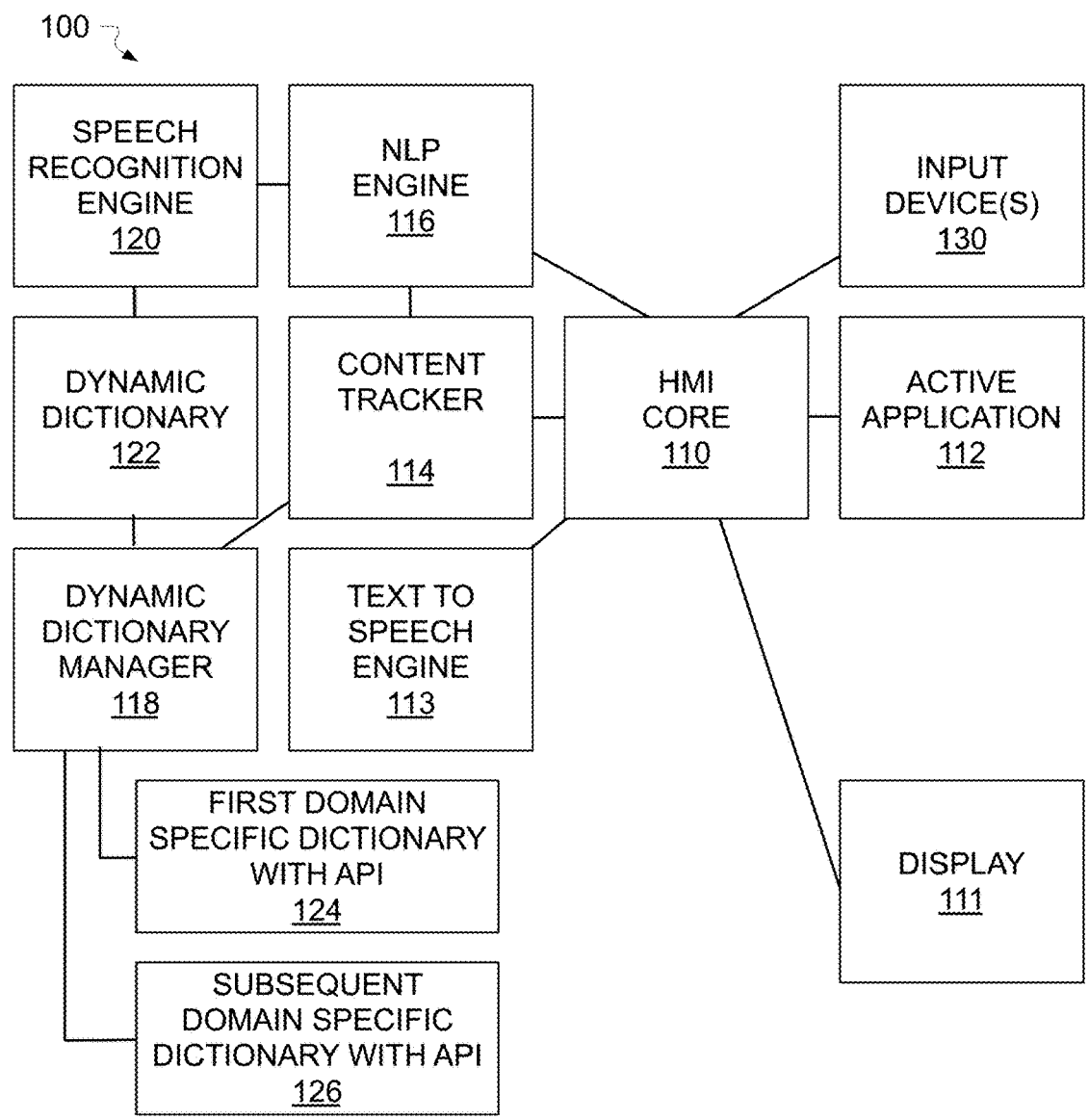
FIG. 1 is an illustrative diagram of an example speech recognizer.
Figure 1:
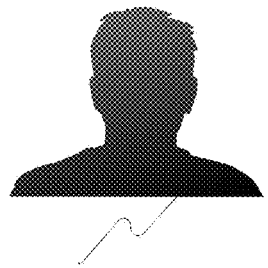

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as set top boxes, smart phones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", etc., indicate that the implementation described may include a particular feature, structure, or characteristic, but every embodiment may not necessarily include the particular feature, structure, or characteristic. Moreover, such phrases are not necessarily referring to the same implementation. Further, when a particular feature, structure, or characteristic is described in connection with an embodiment, it is submitted that it is within the knowledge of one skilled in the art to effect such feature, structure, or characteristic in connection with other implementations whether or not explicitly described herein.

Systems, apparatus, articles, and methods are described below related to coding data including techniques for speech recognition using a dynamic dictionary.

As described above, use of a dictionary with a relatively large number of entries may increase the likelihood of incorrect identification of spoken words due to the possible presence of a relatively larger number of similar entries. Conversely, use of a dictionary with a relatively small number of entries may limit recognition quality. For example, the quality of speech recognition with a large dictionary might vary in quality from one topic to another. As an example, for a large static dictionary might be especially suited to navigation (e.g., street names, cities), but be poorly suited for points of interest (e.g., names of specific entities) or media (e.g., list of tracks, titles, albums, artists, etc). Having a complete static dictionary is practically impossible, but lack of it hurts recognition quality.

As will be described in greater detail below, techniques for speech recognition using a dynamic dictionary are generally disclosed and described herein. Such a dynamic dictionary may take into account the meaning of text to speech output (e.g., what is output by audio or display to a user) and/or the meaning of text to speech user inputs thru natural language processing. Having a dynamic dictionary may improve quality of speech recognition by following the context of discussions in a manner similar to what humans might do.

FIG. 1 is an illustrative diagram of an example speech recognizer system 100, arranged in accordance with at least some implementations of the present disclosure. In the illustrated implementation, speech recognizer system 100 may include components such as human-machine interface core 110, display 111, active application 112, content tracker 114, natural language processing engine 116, dynamic dictionary manager 118, speech recognition engine 120, dynamic dictionary 122, first domain specific dictionary 124, second domain specific dictionary 126, input device(s) 130 the like, and/or combinations thereof. Although speech recognizer system 100, as shown in FIG. 1, may include one particular set of components associated with particular actions, these blocks or actions may be associated with different components than the particular component illustrated here. In some examples, speech recognizer system 100 may be implemented as a product in the mobile, embedded, and/or ultra-thin market segments with 'smart assistant' technology, for example.

As shown, active application 112 may call a function of human-machine interface core 110 to output text to user 102. Output to user 102 may include making text available to user 102 by presenting text on display 111, as audio output, and/or any other means. Active application 112 may include any appropriate application accessed by the user, such as a navigation application, internet browsing application, media player application, operating system subsystem application, or the like.

Human-machine interface core 110 may display output text to user 102 on display 111 or provide output text to text to speech engine 113 for audible transmission to user 102. Human-machine interface core 110 may provide output text associated with active application 112 to natural language processing engine 116.

Natural language processing engine 116 may mark up the output text associated with active application 112 with context data. In some examples, marking up for content may include marking up the output text with context that includes one more of the following kinds of context: textual topics and/or key words. For example, such key words may include media titles, artist names, geographical names, names of the web sites, names of people, names of places, names of things, or the like. Natural language processing engine 116 may provide marked-up output text associated with active application 112 to content tracker 114.

Content tracker 114 may maintain a history of communication interactions, based at least in part on the marked-up output text associated with active application 112. Content tracker 114 may be configured to track application and/or user communication interactions to track a time-type context that provides an indication of the history of communication interactions. Additionally or alternatively, content tracker 114 may be configured to track a category-type context that includes one more of the following kinds of context: video files (e.g., actors, titles, etc.), photo files, address book contacts for phone calls, email, social networks, application-specific context (e.g., cooking recipes, medicine, financial, content of communications, and/or any other specific texts that applications works with), application type of the active application, music files (e.g., authors, titles, albums, etc.), web sites, and/or geographical data, or the like. Additionally or alternatively, content tracker 114 may be configured to track an environmental-type context that may include one more of the following kinds of context: time, location, route, activities, phone call-type events, message-type events, or the like.

Content tracker 114 may determine a listing of new words and/or older existing words based at least in part on the content mark-up and/or the time-type context. Additionally or alternatively, content tracker 114 may determine a listing of new categories and/or older existing categories based at least in part on the time-type context and the category-type context. Further, content tracker 114 may determine a new context filter based at least in part on the environmental-type context. Content tracker 114 may provide dynamic dictionary manager 118 with a listing of new words and/or older existing words, new context categories and/or older existing context categories, and/or a new context filter. As will be described in greater detail below, dynamic dictionary manager 118 may utilize such information to update dynamic dictionary 122.

In some implementations, dynamic dictionary manager 118 may update dynamic dictionary 122, based at least in part on such a listing of new words and/or older existing words, by adding new words and/or removing older existing words. Additionally or alternatively, dynamic dictionary manager 118 may update dynamic dictionary 122, based at least in part on the listing of new context categories and/or older existing context categories, by adding or removing words associated with first domain specific dictionary with API 124 (Application program Interface). The term "domain specific dictionary with API", as used herein, may refer to the capability to process a dictionary in specific manner. For example, in some implementations a domain specific dictionary with API may be filtering lists of geographical places based on proximity to a current location or a list of media titles of specific category.

Figure 2:
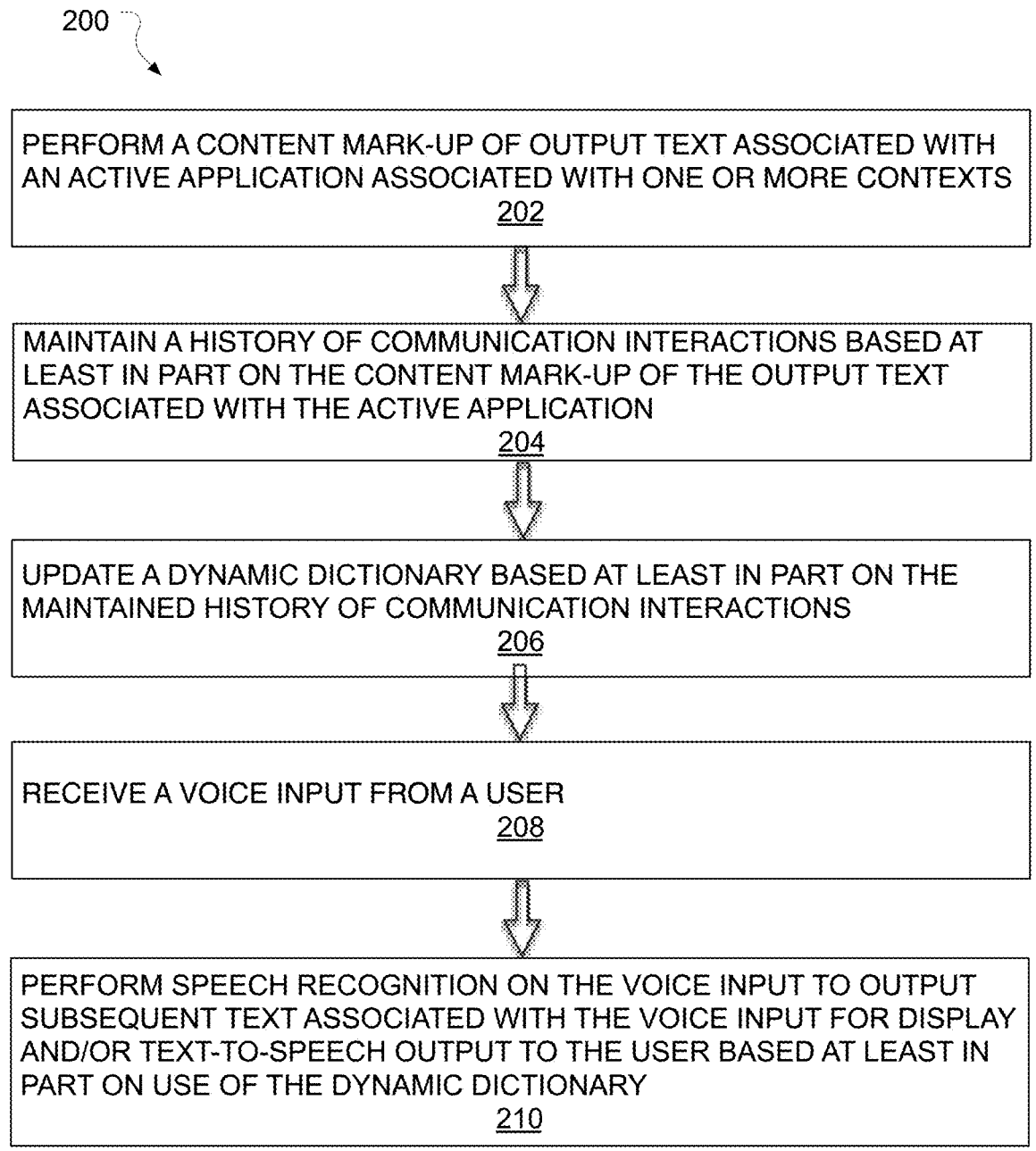
FIG. 2 is a flow diagram illustrating an example speech recognition process.

Further, dynamic dictionary manager 118 may also update dynamic dictionary 122 by adding or removing words associated with subsequent domain specific dictionary with API 126, based at least in part on the listing of new context categories and/or older existing context categories. For example, while first and subsequent domain specific dictionary with API 124, 126 are represented in FIG. 2 for illustrative purposes; additional domain specific dictionaries may be available to dynamic dictionary manager 118 for similar updating of dynamic dictionary 122. Dynamic dictionary manager 118 may update dynamic dictionary 122 by expanding or limiting the scope of words added from any domain specific dictionary with API, based at least in part on the new context filter. Dynamic dictionary manager 118 may update the maintained history of communication interactions maintained by content tracker 114, based at least in part on updates to dynamic dictionary 122.

Input from user 102, via input device(s) 130 may be received by human-machine interface core 110 in the form of speech. Human-machine interface core 110 may provide input 130 speech data to speech recognition engine 120. Speech recognition engine 120 may perform speech recognition on input speech data, based at least in part on use of dynamic dictionary 122. Speech recognition output of speech recognition engine 120 may be provided to human-machine interface core 110 for providing to active application 112. Human-machine interface core 110 may provide speech recognition output of speech recognition engine 120 to natural language processing engine 116 for further mark-up, content tracking, and dynamic dictionary management as discussed above. Any such additional processes have not been repeated in detail for the sake of brevity.

As will be discussed in greater detail below, speech recognizer system 100 may be used to perform some or all of the various functions discussed below in connection with FIGS. 2, 3 and/or 4.

FIG. 2 is an illustrative diagram of an example process 200 for recognizing speech, arranged in accordance with at least some implementations of the present disclosure. In general, process 200 may provide a computer-implemented method for recognizing speech. In the illustrated implementation, process 200 may include one or more operations, functions or actions as illustrated by one or more of blocks 202, 204, 206, 208, and/or 210. However, embodiments herein may include any number of blocks 202-210 such that some may be skipped or the like. Further, various embodiments may include additional operations not shown for the sake of clarity. By way of non-limiting example, process 200 may form at least part of a speech recognition process as undertaken by speech recognizer system 100 of FIG. 1.

Process 200 may begin at operation 202, "Perform A Content Mark-Up Of Output Text Associated With An Active Application Associated With One Or More Contexts", where the output text associated with the active application may be marked up for content with one or more contexts. For example, the content mark-up of the output text may be performed by natural language processing engine 116 of speech recognizer system 100.

Process 200 may continue at operation 204, "Maintain A History Of Communication Interactions Based At Least In Part On The Content Mark-Up Of The Output Text Associated With The Active Application", where the history of communication interactions based at least in part on the content mark-up of the output text associated with the active application may be maintained. For example, the history of communication interactions based at least in part on the content mark-up of the output text associated with the active application may be maintained by content tracker 114 of speech recognizer system 100.

Process 200 may continue at operation 206, "Update A Dynamic Dictionary Based At Least In Part On The Maintained History Of Communication Interactions", where the dynamic dictionary is updated based at least in part on the maintained history of communication interactions. For example, dynamic dictionary manager 118 of speech recognizer system 100 may update the dynamic dictionary 122 of speech recognizer system 100 based at least in part on the maintained history of communication interactions.

Process 200 may continue at operation 208, "Receive A Voice Input From A User", where voice input is received from the user. For example, human-machine interface core 110 of speech recognizer system 100 may receive voice input from user 102 of speech recognizer system 100.

Process 200 may continue at operation 210, "Perform Speech Recognition On The Voice Input To Output Subsequent Text Associated With The Voice Input For Display And/Or Text-To-Speech Output To The User Based At Least In Part On Use Of The Dynamic Dictionary", where speech recognition is performed on the voice input, based at least in part on use of the dynamic dictionary, to output to the user in visual or audible form subsequent text associated with the voice input. For example, speech recognition may be performed by speech recognition engine 120 of speech recognizer system 100 on the voice input from user 102 of speech recognizer system 100, based at least in part on use of dynamic dictionary 122 of speech recognizer system 100, to output to user 102 in visual or audible form subsequent text associated with the voice input.

Some additional and/or alternative details related to process 200 may be illustrated in one or more examples of implementations discussed herein and, in particular, with respect to FIGS. 3 and/or 4 below.

Figure 3:
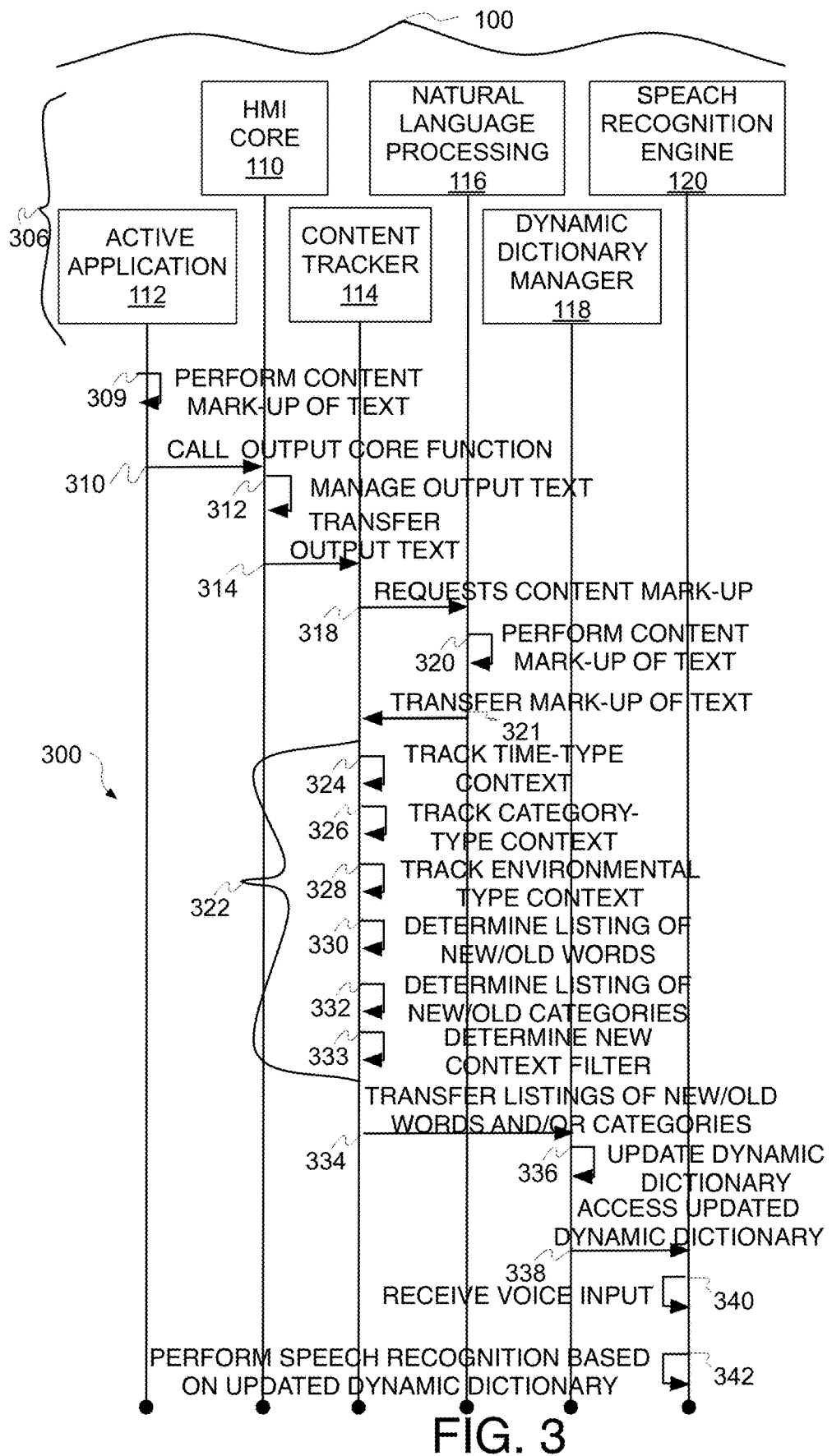
FIG. 3 is an illustrative diagram of an example speech recognizer and speech recognition process in operation.

FIG. 3 is an illustrative diagram of an example speech recognizer system 100 and speech recognition process 300 in operation, arranged in accordance with at least some implementations of the present disclosure. In the illustrated implementation, speech recognition process 300 may include one or more operations, functions or actions as illustrated by one or more of actions 310-342. By way of non-limiting example, process 300 will be described herein with reference to example speech recognizer system 100 of FIG. 1.

In the illustrated implementation, speech recognizer system 100 may include components 306, the like, and/or combinations thereof. By way of non-limiting example, speech recognition process 300 will be described herein with reference to example speech recognizer system 100 of FIG. 1. In the illustrated example, speech recognizer system 100 may include components such as human-machine interface core 110, natural language processing engine 116, speech recognition engine 120, active application 112, content tracker 114, dynamic dictionary manager 118, the like, and/or combinations thereof. Although speech recognizer system 100, as shown in FIG. 3, may include one particular set of blocks or actions associated with particular components, these blocks or actions may be associated with different components than the particular component illustrated here.

Speech recognition process 300 may optionally begin at operation 309, "Perform Content Mark-Up Of Text", where content mark-up of text is performed and transferred. As will be discussed below, in some examples, active application 112 marks up for content output text provided by human-machine interface core 110 in addition or in the alternative to the mark-up performed via natural language processing engine 116 at operation 320. In this case Content Tracker 114 receives already marked up text and may elect to skip operations 318 and 320 and continue with operation 322.

Speech recognition process 300 may continue at operation 310, "Call Output Core Function", where an output core function is called. As discussed, in some examples, active application 112 calls a function of human-machine interface core 110. In some examples, the function may be a function to display text on a display, to output audible text to speech, or the like. In such an example, a system function may be called to display string of text on the screen or process the string of text thru text to speech. Text to display may be passed as an argument of this function call or via a separate operation of transfer.

Speech recognition process 300 may continue at operation 312, "Manage Output Text", where output text is managed. As discussed, in some examples, human-machine interface core 110 manages output text provided by active application 112. In some examples, management of output text may include displaying text on a display, audibly outputting text via text to speech, or the like.

In some examples, HMI core 110 may implement more or less traditional application program interfaces for user interface management. However, HMI core 110 may additionally or alternatively specifically track displayed text information and/or text to speech information. In addition to traditional keyboard/mouse/touch interfaces, HMI core 110 may also support voice commands and route such voice commands to appropriate to applications.

Speech recognition process 300 may continue at operation 314 "Transfer Output Text", where output text is transferred. As discussed, in some examples, human-machine interface core 110 transfers output text to content tracker 114. In some examples, transferring output text may include transferring application association information, context information provided by an application, or the like.

Speech recognition process 300 may continue at operation 318 "Request Content Mark-Up", where a request may be made that the output text be marked-up. In some examples, content tracker 114 may request such a content mark-up from natural language processing 116 and/or from active application 112.

Speech recognition process 300 may continue at operation 320, "Perform Content Mark-Up Of Text", where content mark-up of text is performed and transferred. As discussed, in some examples, natural language processing engine 116 marks up content for output text provided by human-machine interface core 110. In some examples, marking up for content may include marking up the output text with context that includes one more of the following kinds of context: textual topics and/or key words. For example, such key words may include media titles, artist names, geographical names, names of the web sites, names of people, names of places, names of things, or the like. As discussed, in some examples, natural language processing engine 116 transfers marked-up output text to content tracker 114.

In some examples, natural language processing engine 116 may receive text (possibly with emotional mark-up in cases where speech recognition engine 120 supports it) as input and assigns context for each word (e.g., generic, location, address, etc) as well as interpretation of commands interpretation from the user.

Speech recognition process 300 may continue at operation 321, "Transfer Mark-Up Of Text", where content mark-up of text is transferred to content tracker 114.

In some examples, content tracker 114 may accepts all output communication that might have context mark-up (e.g., attributes for each word with context—address, POI, music title, artist, etc.) and/or use natural language processing engine 116 for mark-up of context to support legacy applications.

Speech recognition process 300 may continue at operation 322, where the history of communication interactions based at least in part on the content mark-up of the output text associated with the active application may be maintained, as illustrated in more detail via operations 324-332. For example, the history of communication interactions based at least in part on the content mark-up of the output text associated with the active application may be maintained by content tracker 114 of speech recognizer system 100.

Speech recognition process 300 may continue at operation 324, "Track Time-Type Context", where time-type context is tracked. As discussed, in some examples, content tracker 114 tracks time-type context. In some examples, time-type context includes a history of communication interactions or the like.

Speech recognition process 300 may continue at operation 326, "Track Category-Type Context", where category-type context is tracked. As discussed, in some examples, content tracker 114 tracks category-type context. In some examples, category-type context includes application, file, music, image, video, contact, calendar, website, or geographic information, or the like.

Speech recognition process 300 may continue at operation 328, "Track Environmental-Type Context", where environmental-type context is tracked. As discussed, in some examples, content tracker 114 tracks environmental-type context. In some examples, environmental-type context includes location, time, route, sentence topic, keyword, user, phone call-type events, message-type events, or the like.

Speech recognition process 300 may continue at operation 330, "Determine Listing of New/Old Words", where a list of new words and/or older existing words is determined. As discussed, in some examples, content tracker 114 may determine a listing of new words and/or older existing words, based at least in part on the content mark-up and/or the time-type context Speech recognition process 300 may continue at operation 332, "Determine Listing Of New/Old Categories", where a list of new context categories and/or older existing context categories may be determined. As discussed, in some examples, content tracker 114 may determine a listing of new context categories and/or older existing context categories, based at least in part on the time-type context and/or category-type context.

Speech recognition process 300 may continue at operation 333, "Determine New Context Filter", where a new context filter is determined. As discussed, in some examples, content tracker 114 determines a new context filter, based at least in part on the environmental-type context.

Speech recognition process 300 may continue at operation 334, "Transfer Listing Of New/Old Words And/Or Categories", where a list of new words and/or older existing words, a list of new context categories and/or older existing context categories, and/or a new context filter is transferred. As discussed, in some examples, content tracker 114 transfers a list of new words and/or older existing words, a list of new context categories and/or older existing context categories, and/or a new context filter to dynamic dictionary manager 118.

In some examples, content tracker 114 may operate as a speech context manager, which may maintain a history of interactions associated with the content mark-up of the output text (e.g., address, contact, file, POI name in category, etc.) and may use such history to determine instructions for adapting the dynamic dictionary to improve quality of speech recognition. Such history may take into account the timing of interactions as well as the context of interaction (e.g., not only what was said by user, but also what was delivered to him in the form of displayed text output and/or speech output).

Speech recognition process 300 may continue at operation 336, "Update Dynamic Dictionary", where a dynamic dictionary is updated. As discussed, in some examples, dynamic dictionary manager 118 updates dynamic dictionary 122 by adding or removing words based at least in part on a list of new words and/or older existing words. As discussed, in some examples, dynamic dictionary manager 118 updates dynamic dictionary 122 by adding or removing words based at least in part on a list of new context categories and/or older existing context categories. As discussed, in some examples, dynamic dictionary manager 118 updates dynamic dictionary 122 based at least in part on a list of new context categories and/or older existing context categories by adding or removing words associated with at least one domain specific dictionary with API. As discussed, in some examples, dynamic dictionary manager 118 limits or expands the scope of words added from any domain specific dictionary with API, based at least in part on the new context filter.

In some examples, dynamic dictionary manager 118 may receive a history of interactions stored in content tracker 114 for the last N minutes (which may be an adaptable time period) and based on the context of interactions update the dynamic dictionary using domain specific dictionaries and environmental context (e.g., time, location, route, events (e.g., phone calls, messages, etc.)). As an example for city names, dynamic dictionary manager 118 may use route information to build a list of all cities passed by route, and list of all street names in these cities or along the route. For example, when a user issues commands to play music, the dynamic dictionary may temporarily be extended with names of favorable titles. In another example, when a user issues commands about a route, the dynamic dictionary may temporarily be extended with street names nearby. Similarly, when a user issues commands about points of interest, the dynamic dictionary may temporarily be extended with a list of point of interest names in a specific category nearby.

Speech recognition process 300 may continue at operation 338, "Access Updated Dynamic Dictionary", where an updated dictionary is accessed. As discussed, in some examples, speech recognition engine 120 accesses dynamic dictionary 122.

Speech recognition process 300 may continue at operation 340, "Receive Voice Input", where voice input is received. As discussed, in some examples, speech recognition engine 120 receives voice input 130 from user 102.

Speech recognition process 300 may continue at operation 342, "Perform Speech Recognition Based On Updated Dynamic Dictionary", where speech recognition is performed, based on an updated dictionary. As discussed, in some examples, speech recognition engine 120 may perform speech recognition on input speech data, based at least in part on use of dynamic dictionary 122.

In operation, process 300 may operate so that speech recognition output of speech recognition engine 120 may be provided to human-machine interface core 110 for display to a user on display 111 (e.g., see FIG. 1), for providing to text to speech engine 113 (e.g., see FIG. 1) for audible transmission to user 102, and/or for providing to active application 112. Human-machine interface core 110 may provide speech recognition output of speech recognition engine 120 to content tracker 114 and/or natural language processing engine 116 for further mark-up, content tracking, and dynamic dictionary management as discussed above. Any such additional processes have not been repeated in detail for the sake of brevity.

In operation, process 300 may operate so that active application 112 may call an HMI core function to output text (e.g., either on screen or via text to speech). HMI core 110 may manage what text information is visible on the screen and may call content tracker 114 on updates. Content tracker 114 may calls natural language processing engine 116 in cases of 'legacy' applications, which may not provide context mark-up for text output. Natural language processing engine 116 marks part of text based on context. This may include general topic of sentence, specific words (e.g., media titles, geographical names, etc.) and may return processed information to content tracker 114. Content tracker 114 may analyze the history of communications and provides updates to dynamic dictionary manager 118. This update may include new words to be added and old words to be removed, as well as new and old contexts (e.g., music files, video, geographical, etc). Content tracker 114 may pass control to appropriate display or text to speech engines in cases where finished communicating with dynamic dictionary manager 118. Dynamic dictionary manager 118 may update the dynamic dictionary used by speech recognition engine 120 based at least in part on information provided by content tracker 114.

Figure 4:
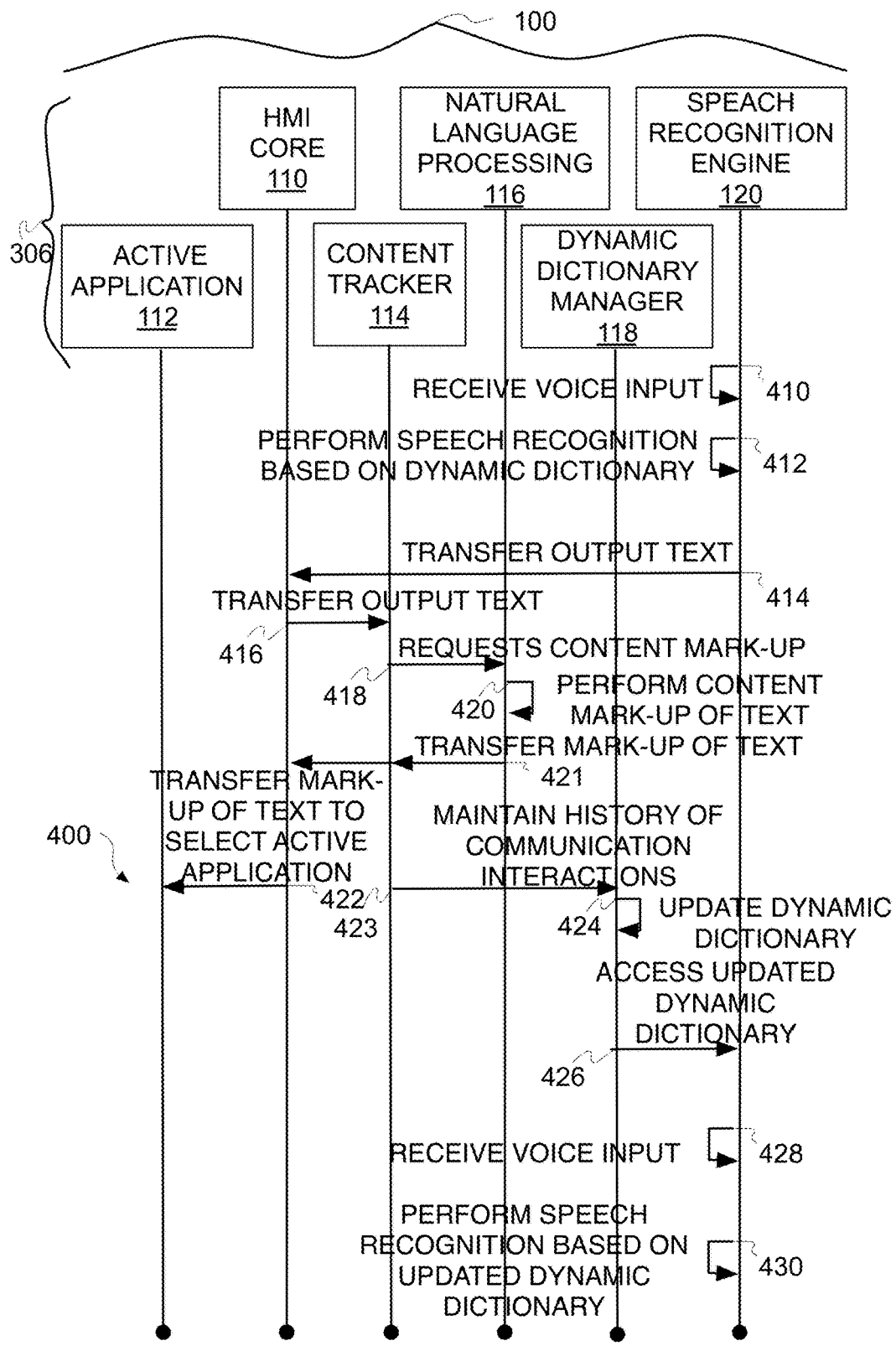
FIG. 4 is an illustrative diagram of an example speech recognizer and speech recognition process in operation.

FIG. 4 is an illustrative diagram of an example speech recognizer system 100 and speech recognition process 400 in operation, arranged in accordance with at least some implementations of the present disclosure. In the illustrated implementation, speech recognition process 400 may include one or more operations, functions or actions as illustrated by one or more of actions 410-430. By way of non-limiting example, process 400 will be described herein with reference to example speech recognizer system 100 of FIG. 1.

In the illustrated implementation, speech recognizer system 100 may include components 306, the like, and/or combinations thereof. By way of non-limiting example, speech recognition process 400 will be described herein with reference to example speech recognizer system 100 of FIG. 1. In the illustrated example, speech recognizer system 100 may include components such as human-machine interface core 110, natural language processing engine 116, speech recognition engine 120, active application 112, content tracker 114, dynamic dictionary manager 118, the like, and/or combinations thereof. Although speech recognizer system 100, as shown in FIG. 4, may include one particular set of blocks or actions associated with particular components, these blocks or actions may be associated with different components than the particular component illustrated here.

Speech recognition process 400 may begin at operation 410, "Receive Speech Input", where voice input is received. In some examples, speech recognition engine 120 receives speech input.

Speech recognition process 400 may continue at operation 412, "Perform Speech Recognition Based On Dynamic Dictionary", where speech recognition is performed based on a dictionary. As discussed, in some examples, speech recognition engine 120 performs speech recognition based on dynamic dictionary 122.

Speech recognition process 400 may continue at operation 414 "Transfer Output Text", where output text is transferred. As discussed, in some examples, speech recognition engine 120 provides speech recognition output text to HMI core 110, which may transfer such text to content tracker 114 and/or active application 112.

Speech recognition process 400 may continue at operation 416, "Transfer Output Text", where output text is transferred. In some examples, speech recognition process 400 may operate so that speech recognition engine 120 provides speech recognition output text to content tracker 114 via human machine interface core 110 calling content tracker 114 and passing text from speech recognition engine 120 to content tracker 114.

Speech recognition process 400 may continue at operation 418, "Requests Content Mark-Up", where content mark-up of text is requested. In some examples, content tracker 114 requests content mark-up of speech recognition output text by natural language processing unit 116.

Speech recognition process 400 may continue at operation 420, "Perform Content Mark-Up Of Text", where content mark-up of text is performed and transferred. As discussed, in some examples, natural language processing engine 116 marks up for content output text provided by human-machine interface core 110. In some examples, marking up for content may include marking up the output text with context that includes one more of the following kinds of context: textual topics and/or key words. For example, such key words may include media titles, artist names, geographical names, names of the web sites, names of people, names of places, names of things, or the like. As discussed, in some examples, natural language processing engine 116 transfers marked-up output text to content tracker 114.

Additionally or alternatively, in some examples, active application 112 marks up for content output text provided by human-machine interface core 110 in addition or in the alternative to the mark-up performed via natural language processing engine 116 at operation 420. In this case Content Tracker 114 receives already marked up text and may elect to skip operations 418 and 420 and continue with operation 423.

Speech recognition process 400 may continue at operation 421, "Transfer Mark-Up Of Text", where content mark-up of text is transferred to content tracker 114 and/or to HMI core 110.

Speech recognition process 400 may continue at operation 422 "Transfer Mark-Up of Text to Select Active Application" where an active application may be selected and the marked-up input text may be transferred to the selected active application. For example, HMI Core 110 may decide, based on context, which Active Application 112 should receive marked-up input text in cases where several applications run in parallel that may expect voice input from user.

Speech recognition process 400 may continue at operation 423, "Maintain History Of Communication Interactions", where a history of communication is maintained. As discussed, in some examples, content tracker 114 maintains a history of communication interactions. In some examples, the history of communication interactions may include: a time-type context that provides an indication of the history of communication interactions; a category-type context that includes one more of the following kinds of context: application type of the active application, video files (e.g., actors, titles, etc.), photo files, address book contacts for phone calls, email, social networks, application-specific context (e.g., cooking recipes, medicine, financial, content of communications, and/or any other specific texts that applications works with), application type of the active application, music files (e.g., authors, titles, albums, etc.), web sites, and/or geographical data, or the like; and/or an environmental-type context that may include one more of the following kinds of context: time, location, route, activities, phone call-type events, message-type events, or the like. In some examples, maintaining a history of communication interactions includes providing dynamic dictionary manager 118 with information to update dynamic dictionary 122.

Speech recognition process 400 may continue at operation 424, "Update Dynamic Dictionary", where a dynamic dictionary may be updated. In some examples, dynamic dictionary manager 118 updates dynamic dictionary 122 by adding or removing words based at least in part on a list of new words and/or older existing words. In some examples, dynamic dictionary manager 118 updates dynamic dictionary 122 by adding or removing words based at least in part on a list of new context categories and/or older existing context categories. In some examples, dynamic dictionary manager 118 updates dynamic dictionary 122 based at least in part on a list of new context categories and/or older existing context categories by adding or removing words associated with at least one domain specific dictionary with API. In some examples, dynamic dictionary manager 118 limits or expands the scope of words added from any domain specific dictionary with API, based at least in part on a new context filter.

Speech recognition process 400 may continue at operation 426, "Access Updated Dynamic Dictionary", where an updated dictionary is accessed. In some examples, speech recognition engine 120 accesses dynamic dictionary 122.

Speech recognition process 400 may continue at operation 428, "Receive Voice Input", where voice input is received. In some examples, speech recognition engine 120 receives voice input.

Speech recognition process 400 may continue at operation 430, "Perform Speech Recognition Based On Updated Dynamic Dictionary", where speech recognition is performed, based on an updated dictionary. In some examples, speech recognition engine 120 may perform speech recognition on input 130 speech data, based at least in part on use of dynamic dictionary 122.

In operation, process 400 may operate so that speech recognition output of speech recognition engine 120 may be provided to human-machine interface core 110 for display to a user on display 111 (e.g., see FIG. 1), for providing to text to speech engine 113 (e.g., see FIG. 1) for audible transmission to user 102, and/or for providing to active application 112. Human-machine interface core 110 may provide speech recognition output of speech recognition engine 120 to content tracker 114 and/or natural language processing engine 116 for further mark-up, content tracking, and dynamic dictionary management as discussed above. Any such additional processes have not been repeated in detail for the sake of brevity.

In operation, process 400 may operate so that speech recognition engine 120 gets voice input from a user and in addition to internal processing algorithms (which might take into account language models), speech recognition engine 120 may utilize the updated dynamic dictionary to improve quality of recognition. The result of speech recognition may be passed to content tracker 114. Content tracker 114 may call natural language processing engine 116. The output of natural language processing 116 may be passed to HMI core 110 for further processing and routing to appropriate applications (e.g., "SELECT ACTIVE APPLICATION"), and processed further by content tracker 114 for maintaining history and context of interactions. Content tracker 114 may analyze the history of communications and provides updates to dynamic dictionary manager 118. This update may include new words to be added and old words to be removed, as well as new and old contexts (e.g., music files, video, geographical, etc). Dynamic dictionary manager 118 may update the dynamic dictionary used by speech recognition engine 120 based at least in part on information provided by content tracker 114.

While implementation of the example processes herein may include the undertaking of all blocks shown in the order illustrated, the present disclosure is not limited in this regard and, in various examples, implementation of the example processes herein may include the undertaking of only a subset of the blocks shown, blocks can be combined together or divided into sub-blocks, and/or in a different order than illustrated.

In addition, any one or more of the blocks discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more processor core(s) may undertake one or more of the blocks of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein.

As used in any implementation described herein, the term "module" refers to any combination of software logic, firmware logic and/or hardware logic configured to provide the functionality described herein. The software may be embodied as a software package, code and/or instruction set, and "hardware", as used in any implementation described herein, may include, for example, singly or in any combination, hardwired circuitry, programmable circuitry, state machine circuitry, and/or firmware that stores instructions executed by programmable circuitry. The modules may, collectively or individually, be embodied as circuitry that forms part of a larger system, for example, an integrated circuit (IC), system on-chip (SoC), and so forth. For example, a module may be embodied in logic circuitry for the implementation via software, firmware, or hardware of the coding systems discussed herein.

As used in any implementation described herein, the term "logic unit" refers to any combination of firmware logic and/or hardware logic configured to provide the functionality described herein. The "hardware", as used in any implementation described herein, may include, for example, singly or in any combination, hardwired circuitry, programmable circuitry, state machine circuitry, and/or firmware that stores instructions executed by programmable circuitry. The logic units may, collectively or individually, be embodied as circuitry that forms part of a larger system, for example, an integrated circuit (IC), system on-chip (SoC), and so forth. For example, a logic unit may be embodied in logic circuitry for the implementation firmware or hardware of the coding systems discussed herein. One of ordinary skill in the art will appreciate that operations performed by hardware and/or firmware may alternatively be implemented via a software module, which may be embodied as a software package, code and/or instruction set, and also appreciate that a logic unit may also utilize a portion of software to implement its functionality.

As used in any implementation described herein, the term "engine" and/or "component" may refer to a module or to a logic unit, as these terms are described above.

Figure 5:
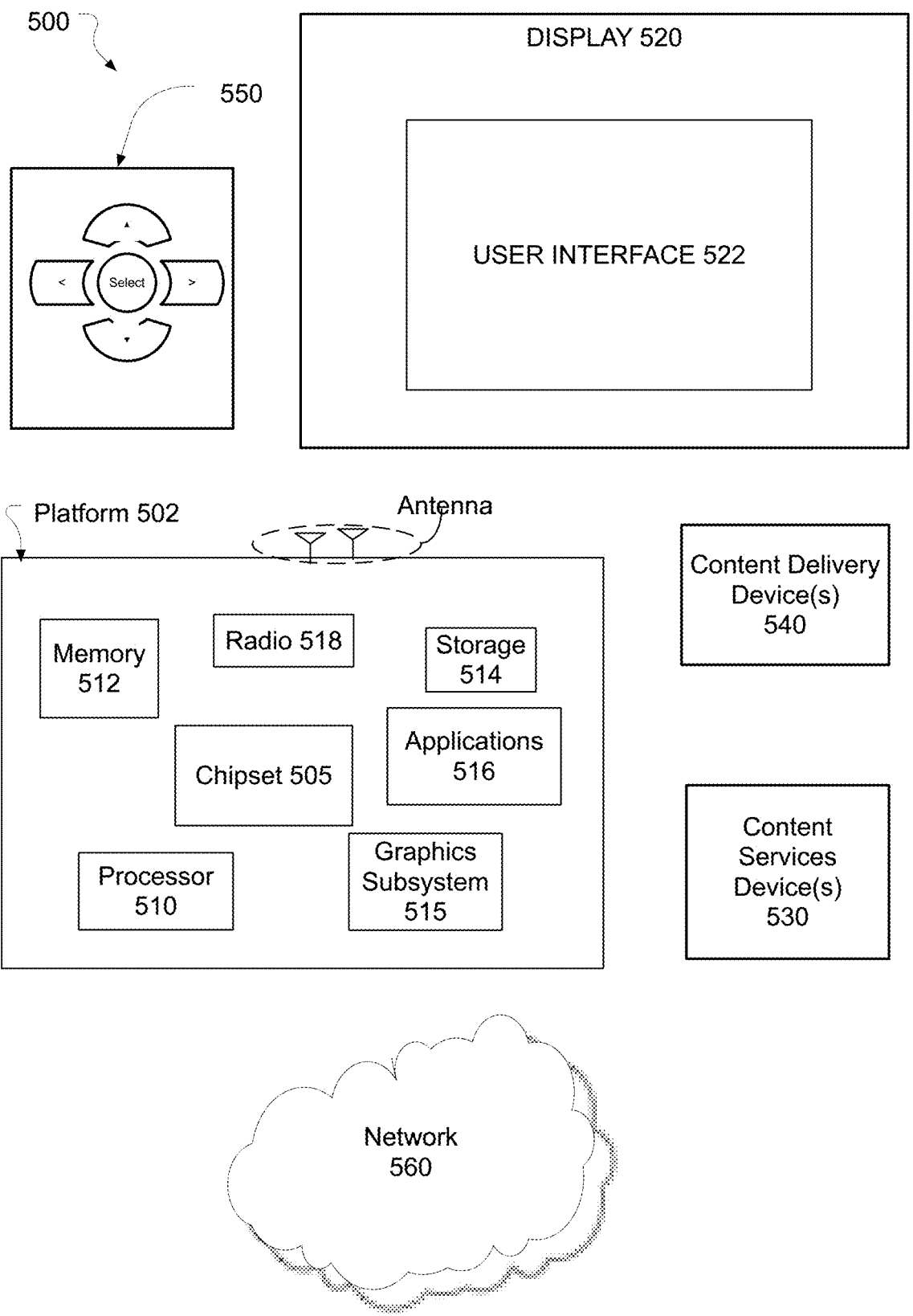
FIG. 5 is an illustrative diagram of an example system.

FIG. 5 illustrates an example system 500 in accordance with the present disclosure. In various implementations, system 500 may be a media system although system 500 is not limited to this context. For example, system 500 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In various implementations, system 500 includes a platform 502 coupled to a display 520. Platform 502 may receive content from a content device such as content services device(s) 530 or content delivery device(s) 540 or other similar content sources. A navigation controller 550 including one or more navigation features may be used to interact with, for example, platform 502 and/or display 520. Each of these components is described in greater detail below.

In various implementations, platform 502 may include any combination of a chipset 505, processor 510, memory 512, storage 514, graphics subsystem 515, applications 516 and/or radio 518. Chipset 505 may provide intercommunication among processor 510, memory 512, storage 514, graphics subsystem 515, applications 516 and/or radio 518. For example, chipset 505 may include a storage adapter (not depicted) capable of providing intercommunication with storage 514.

Processor 510 may be implemented as a Complex Instruction Set Computer (CISC) or Reduced Instruction Set Computer (RISC) processors; x86 instruction set compatible processors, multi-core, or any other microprocessor or central processing unit (CPU). In various implementations, processor 510 may be dual-core processor(s), dual-core mobile processor(s), and so forth.

Memory 512 may be implemented as a volatile memory device such as, but not limited to, a Random Access Memory (RAM), Dynamic Random Access Memory (DRAM), or Static RAM (SRAM).

Storage 514 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 514 may include technology to increase the storage performance enhanced protection for valuable digital media when multiple hard drives are included, for example.

Graphics subsystem 515 may perform processing of images such as still or video for display. Graphics subsystem 515 may be a graphics processing unit (GPU) or a visual processing unit (VPU), for example. An analog or digital interface may be used to communicatively couple graphics subsystem 515 and display 520. For example, the interface may be any of a High-Definition Multimedia Interface, Display Port, wireless HDMI, and/or wireless HD compliant techniques. Graphics subsystem 515 may be integrated into processor 510 or chipset 505. In some implementations, graphics subsystem 515 may be a stand-alone card communicatively coupled to chipset 505.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further embodiments, the functions may be implemented in a consumer electronics device.

Radio 518 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 518 may operate in accordance with one or more applicable standards in any version.

In various implementations, display 520 may include any television type monitor or display. Display 520 may include, for example, a computer display screen, touch screen display, video monitor, television-like device, and/or a television. Display 520 may be digital and/or analog. In various implementations, display 520 may be a holographic display. Also, display 520 may be a transparent surface that may receive a visual projection. Such projections may convey various forms of information, images, and/or objects. For example, such projections may be a visual overlay for a mobile augmented reality (MAR) application. Under the control of one or more software applications 516, platform 502 may display user interface 522 on display 520.

In various implementations, content services device(s) 530 may be hosted by any national, international and/or independent service and thus accessible to platform 502 via the Internet, for example. Content services device(s) 530 may be coupled to platform 502 and/or to display 520. Platform 502 and/or content services device(s) 530 may be coupled to a network 560 to communicate (e.g., send and/or receive) media information to and from network 560. Content delivery device(s) 540 also may be coupled to platform 502 and/or to display 520.

In various implementations, content services device(s) 530 may include a cable television box, personal computer, network, telephone, Internet enabled devices or appliance capable of delivering digital information and/or content, and any other similar device capable of unidirectionally or bidirectionally communicating content between content providers and platform 502 and/display 520, via network 560 or directly. It will be appreciated that the content may be communicated unidirectionally and/or bidirectionally to and from any one of the components in system 500 and a content provider via network 560. Examples of content may include any media information including, for example, video, music, medical and gaming information, and so forth.

Content services device(s) 530 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 502 may receive control signals from navigation controller 550 having one or more navigation features. The navigation features of controller 550 may be used to interact with user interface 522, for example. In embodiments, navigation controller 550 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 550 may be replicated on a display (e.g., display 520) by movements of a pointer, cursor, focus ring, or other visual indicators displayed on the display. For example, under the control of software applications 516, the navigation features located on navigation controller 550 may be mapped to virtual navigation features displayed on user interface 522, for example. In embodiments, controller 550 may not be a separate component but may be integrated into platform 502 and/or display 520. The present disclosure, however, is not limited to the elements or in the context shown or described herein.

In various implementations, drivers (not shown) may include technology to enable users to instantly turn on and off platform 502 like a television with the touch of a button after initial boot-up, when enabled, for example. Program logic may allow platform 502 to stream content to media adaptors or other content services device(s) 530 or content delivery device(s) 540 even when the platform is turned "off." In addition, chipset 505 may include hardware and/or software support for surround sound audio and/or high definition surround sound audio, for example. Drivers may include a graphics driver for integrated graphics platforms. In embodiments, the graphics driver may comprise a peripheral component interconnect (PCI) Express graphics card.

In various implementations, any one or more of the components shown in system 500 may be integrated. For example, platform 502 and content services device(s) 530 may be integrated, or platform 502 and content delivery device(s) 540 may be integrated, or platform 502, content services device(s) 530, and content delivery device(s) 540 may be integrated, for example. In various embodiments, platform 502 and display 520 may be an integrated unit. Display 520 and content service device(s) 530 may be integrated, or display 520 and content delivery device(s) 540 may be integrated, for example. These examples are not meant to limit the present disclosure.

In various embodiments, system 500 may be implemented as a wireless system, a wired system, or a combination of both. When implemented as a wireless system, system 500 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 500 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 502 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 5.

Figure 6:
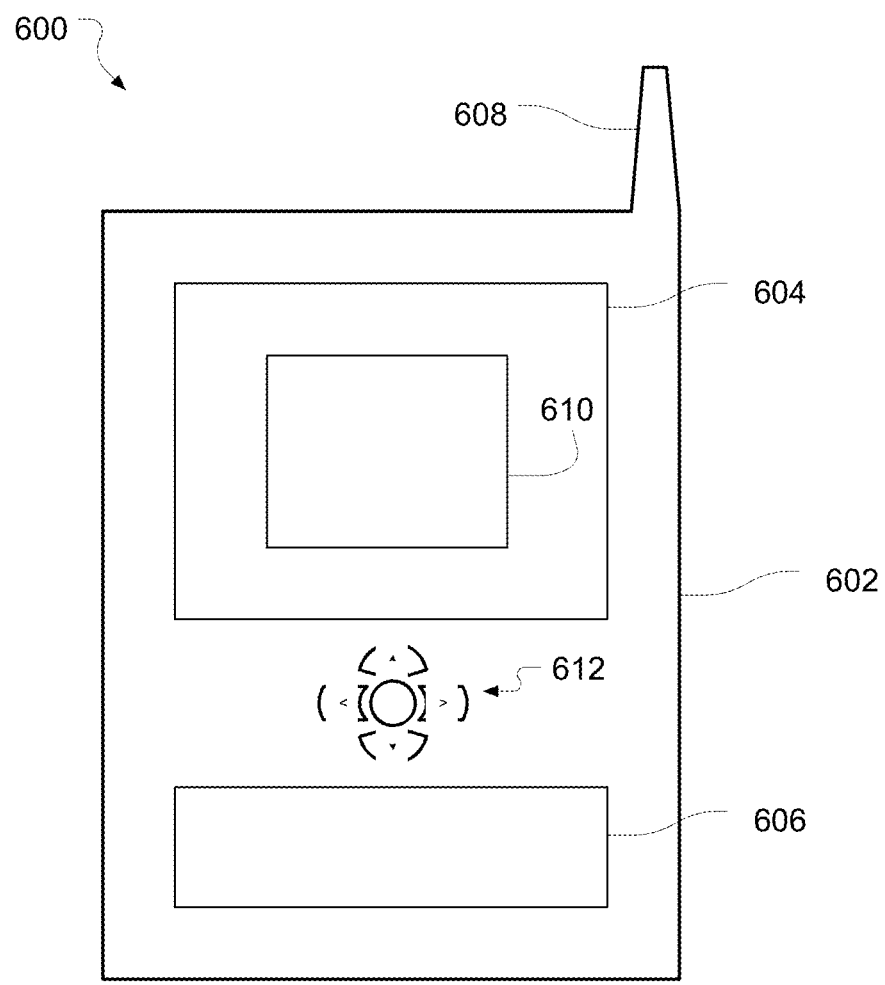
FIG. 6 illustrates an example device, all arranged in accordance with at least some implementations of the present disclosure.

As described above, system 500 may be embodied in varying physical styles or form factors. FIG. 6 illustrates implementations of a small form factor device 600 in which system 500 may be embodied. In embodiments, for example, device 600 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 6, device 600 may include a housing 602, a display 604, an input/output (I/O) device 606, and an antenna 608. Device 600 also may include navigation features 612. Display 604 may include any suitable display unit for displaying information appropriate for a mobile computing device. I/O device 606 may include any suitable I/O device for entering information into a mobile computing device. Examples for I/O device 606 may include an alphanumeric keyboard, a numeric keypad, a touch pad, input keys, buttons, switches, rocker switches, microphones, speakers, voice recognition device and software, and so forth. Information also may be entered into device 600 by way of microphone (not shown). Such information may be digitized by a voice recognition device (not shown). The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The following examples pertain to further embodiments.

In one example, a computer-implemented method for speech recognition may include performing a content mark-up, via a natural language processing engine, of output text associated with an active application associated with one or more contexts. A history of communication interactions may be maintained, via a content tracker, based at least in part on the content mark-up of the output text associated with the active application. A dynamic dictionary may be updated, via a dynamic dictionary manager, based at least in part on the maintained history of communication interactions. A voice input from a user may be received. Speech recognition may be performed, via a speech recognition engine, on the voice input to output subsequent text associated with the voice input for display and/or text-to-speech output to the user based at least in part on use of the dynamic dictionary.

In a further example of a computer-implemented method for speech recognition may include: prior to performing the content mark-up: calling an output core function, via the active application, configured to output text associated with the active application. The output text may be managed, via the processor core, for display and/or text-to-speech output to the user via the active application, where the processor core is a Human Machine Interface-type processor core. The output text associated with the active application may be transferred to the content tracker, via the processor core. The performance of the content mark-up, via the natural language processing engine, may include marking up the output text with context that includes one more of the following kinds of context: textual topics and/or key words. Maintaining the history of communication interactions, via the content tracker, may include tracking application and/or user communication interactions, and may include: tracking a time-type context that provides an indication of the history of communication interactions; tracking a category-type context that includes one more of the following kinds of context: application type of the active application, video files (e.g., actors, titles, etc.), photo files, address book contacts for phone calls, email, social networks, application-specific context (e.g., cooking recipes, medicine, financial, content of communications, and/or any other specific texts that applications works with), application type of the active application, music files (e.g., authors, titles, albums, etc.), web sites, and/or geographical data; tracking an environmental-type context that includes one more of the following kinds of context: time, location, route, activities, phone call-type events, and/or message-type events; determining a listing of new words and/or older existing words based at least in part on the content mark-up and/or the time-type context; determining a listing of new categories and/or older existing categories based at least in part on the time-type context and the category-type context; and/or determining a new context filter based at least in part on the environmental-type context. The updating of the dynamic dictionary, via the dynamic dictionary manager, may be based at least in part on the maintained history of communication interactions, and may include: updating the dynamic dictionary by adding new words and/or removing existing words based at least in part on the listing of new words and/or older existing words; updating the dynamic dictionary by removing words associated with one or more domain specific dictionaries based at least in part on the listing of older existing categories; and/or updating the dynamic dictionary by accessing one or more domain specific dictionaries based at least in part on the listing of new categories, and limiting the scope of words chosen from the selected one or more domain specific dictionaries based at least in part on the new context filter.

In a further example of a computer-implemented method for speech recognition may include: marking-up the output subsequent text associated with the voice input with one or more contexts as marked-up speech recognition output. The updating of the dynamic dictionary further may include updating the dynamic dictionary based at least in part on the content mark-up of the marked-up speech recognition output. The marked-up speech recognition output may be routed, via a processor core, to one or more applications for display and/or text-to-speech output to the user.

In another example, a system for performing speech recognition on a computer, may include a natural language processing engine configured to perform a content mark-up of output text associated with an active application associated with one or more contexts. A content tracker may be configured to maintain a history of communication interactions based at least in part on the content mark-up of the output text associated with the active application. A dynamic dictionary manager may be configured to update a dynamic dictionary based at least in part on the maintained history of communication interactions. An input device may be configured to receive a voice input from a user. A speech recognition engine may be configured to perform speech recognition on the voice input to output subsequent text associated with the voice input for display and/or text-to-speech output to the user based at least in part on use of the dynamic dictionary.

In a further example of a system for performing speech recognition on a computer, the system may include a processor core configured to: manage the output text associated with the active application for display and/or text-to-speech output to the user via the active application prior to performance of the content mark-up, where the processor core is a Human Machine Interface-type processor core; and transfer the output text associated with the active application to the content tracker. The natural language processing engine may be further configured to mark up the output text with context that includes one more of the following kinds of context: textual topics and/or key words. The content tracker may be further configured to track application and/or user communication interactions, and further configured to: track a time-type context that provides an indication of the history of communication interactions; track a category-type context that includes one more of the following kinds of context: application type of the active application, video files (e.g., actors, titles, etc.), photo files, address book contacts for phone calls, email, social networks, application-specific context (e.g., cooking recipes, medicine, financial, content of communications, and/or any other specific texts that applications works with), application type of the active application, music files (e.g., authors, titles, albums, etc.), web sites, and/or geographical data; track an environmental-type context that includes one more of the following kinds of context: time, location, route, activities, phone call-type events, and/or message-type events; determine a listing of new words and/or older existing words based at least in part on the content mark-up and/or the time-type context; determine a listing of new categories and/or older existing categories based at least in part on the time-type context and the category-type context; and/or determine a new context filter based at least in part on the environmental-type context. The dynamic dictionary manager may be further configured to update the dynamic dictionary based at least in part on a maintained history of communication interactions, and further configured to: update the dynamic dictionary by adding new words and/or removing existing words based at least in part on the listing of new words and/or older existing words; update the dynamic dictionary by removing words associated with one or more domain specific dictionaries based at least in part on the listing of older existing categories; and/or update the dynamic dictionary by accessing one or more domain specific dictionaries based at least in part on the listing of new categories, and limiting the scope of words chosen from the selected one or more domain specific dictionaries based at least in part on the new context filter.

In a further example of a system for performing speech recognition on a computer, the system may include performance of a mark-up of the output subsequent text associated with the voice input with one or more contexts as marked-up speech recognition output. The update of the dynamic dictionary further includes an update of the dynamic dictionary based at least in part on the content mark-up of the marked-up speech recognition output. A processor core configured to route the marked-up speech recognition output to one or more applications for display and/or text-to-speech output to the user.

In another example, an apparatus for performing speech recognition on a computer may include a natural language processing engine configured to perform a content mark-up of output text associated with an active application associated with one or more contexts. A content tracker may be configured to maintain a history of communication interactions based at least in part on the content mark-up of the output text associated with the active application. A dynamic dictionary manager may be configured to update a dynamic dictionary based at least in part on the maintained history of communication interactions. An input device may be configured to receive a voice input from a user. A speech recognition engine may be configured to perform speech recognition on the voice input to output subsequent text associated with the voice input for display and/or text-to-speech output to the user based at least in part on use of the dynamic dictionary.

In a further example of an apparatus for performing speech recognition on a computer, the apparatus may include a processor core that may be configured to: manage the output text associated with the active application for display and/or text-to-speech output to the user via the active application prior to performance of the content mark-up, where the processor core may be a Human Machine Interface-type processor core; and may transfer the output text associated with the active application to the content tracker. The natural language processing engine may be further configured to mark up the output text with context that includes one more of the following kinds of context: textual topics and/or key words. The content tracker may be further configured to track application and/or user communication interactions, and may be further configured to: track a time-type context that provides an indication of the history of communication interactions; track a category-type context that includes one more of the following kinds of context: application type of the active application, video files, photo files, address book contacts for phone calls, email, social networks, application-specific context, music files, web sites, and/or geographical data; track an environmental-type context that includes one more of the following kinds of context: time, location, route, activities, phone call-type events, and/or message-type events; determine a listing of new words and/or older existing words based at least in part on the content mark-up and/or the time-type context; determine a listing of new categories and/or older existing categories based at least in part on the time-type context and the category-type context; and/or determine a new context filter based at least in part on the environmental-type context. The dynamic dictionary manager may be further configured to update the dynamic dictionary based at least in part on a maintained history of communication interactions, and further configured to: update the dynamic dictionary by adding new words and/or removing existing words based at least in part on the listing of new words and/or older existing words; update the dynamic dictionary by removing words associated with one or more domain specific dictionaries based at least in part on the listing of older existing categories; and/or update the dynamic dictionary by accessing one or more domain specific dictionaries based at least in part on the listing of new categories, and limiting the scope of words chosen from the selected one or more domain specific dictionaries based at least in part on the new context filter.

In a still further example of an apparatus for performing speech recognition on a computer, the performance of the content mark-up may include performance of a mark-up of the output subsequent text associated with the voice input with one or more contexts as marked-up speech recognition output. The update of the dynamic dictionary may further include an update of the dynamic dictionary based at least in part on the content mark-up of the marked-up speech recognition output. The apparatus for performing speech recognition on a computer may further include a processor core that may be configured to route the marked-up speech recognition output to one or more applications for display and/or text-to-speech output to the user.

In a further example, at least one machine readable medium may include a plurality of instructions that in response to being executed on a computing device, cause the computing device to perform the method according to any one of the above examples.

In a still further example, an apparatus may include means for performing the methods according to any one of the above examples.

The above examples may include specific combination of features. However, such the above examples are not limited in this regard and, in various implementations, the above examples may include the undertaking only a subset of such features, undertaking a different order of such features, undertaking a different combination of such features, and/or undertaking additional features than those features explicitly listed. For example, all features described with respect to the example methods may be implemented with respect to the example apparatus, the example systems, and/or the example articles, and vice versa.

What is claimed:

1. A computer-implemented method for speech recognition comprising:
communicating output text to a user from an active application;
performing a content mark-up, via a natural language processing engine, of the output text, wherein the performing of the content mark-up by the natural language processing engine is done in response to the communication of the output text from the active application to the user even in the absence of receiving voice input and even in the absence of performing speech recognition;
maintaining a history of communication interactions, via a content tracker, in response to the content mark-up of the output text associated with the active application;
determining a listing of new words in response to the content mark-up of the output text from the active application previously performed by the natural language processing engine;
determining a listing of older existing words in response to the content mark-up of the output text from the active application previously performed by the natural language processing engine;
updating a dynamic dictionary, via a dynamic dictionary manager, based at least in part on the maintained history of communication interactions, wherein the updating of the dynamic dictionary includes adding new words based at least in part on the listing of new words without accessing one or more domain specific dictionaries, and wherein the updating of the dynamic dictionary includes removing existing words based at least in part on the listing of older existing words without accessing one or more domain specific dictionaries;
receiving a voice input from a user;
performing speech recognition, via a speech recognition engine, on the voice input to output subsequent text associated with the voice input for display and/or text-to-speech output to the user based at least in part on use of the dynamic dictionary; and
displaying output to the user and presenting text-to-speech output to the user in response to the performed speech recognition based at least in part on use of the dynamic dictionary.

2. The method of claim 1, further comprising:
prior to performing the content mark-up: calling an output core function, via the active application, configured to output text associated with the active application;
managing the output text, via the processor core, for display and/or text-to-speech output to the user via the active application, wherein the processor core is a Human Machine Interface-type processor core; and
transferring the output text associated with the active application to the content tracker, via the processor core.

3. The method of claim 1, wherein the performance of the content mark-up, via the natural language processing engine, includes marking up the output text with context that includes one or more of the following kinds of context: textual topics and/or key words.

4. The method of claim 1, wherein maintaining the history of communication interactions, via the content tracker, includes tracking application and/or user communication interactions.

5. The method of claim 1, wherein maintaining the history of communication interactions, via the content tracker, includes tracking application and/or user communication interactions, and comprises:
tracking a time-type context that provides an indication of the history of communication interactions;
tracking a category-type context that includes one or more of the following kinds of context: application type of the active application, video files, photo files, address book contacts for phone calls, email, social networks, application-specific context, music files, web sites, and/or geographical data;
tracking an environmental-type context that includes one or more of the following kinds of context: time, location, route, activities, phone call-type events, and/or message-type events;
determining a listing of new categories and/or older existing categories based at least in part on the time-type context and the category-type context; and
determining a new context filter based at least in part on the environmental-type context.

6. The method of claim 1, wherein the updating of the dynamic dictionary, via the dynamic dictionary manager, based at least in part on a maintained history of communication interactions, comprises:
updating the dynamic dictionary by removing words associated with one or more of the domain specific dictionaries based at least in part on a listing of older existing categories; and
updating the dynamic dictionary by accessing one or more of the domain specific dictionaries based at least in part on a listing of new categories, and limiting the scope of words chosen from the accessed domain specific dictionaries to a subset of available words available from the accessed domain specific dictionaries based at least in part on a new context filter.

7. The method of claim 1,
wherein the performance of the content mark-up includes marking-up the output subsequent text associated with the voice input with one or more contexts as marked-up speech recognition output, and
wherein the updating of the dynamic dictionary further includes updating the dynamic dictionary based at least in part on the content mark-up of the marked-up speech recognition output.

8. The method of claim 1,
wherein the performance of the content mark-up includes marking-up the output subsequent text associated with the voice input with one or more contexts as marked-up speech recognition output, and
routing the marked-up speech recognition output, via the processor core, to one or more applications for display and/or text-to-speech output to the user.

9. The method of claim 1, further comprising:
prior to performing the content mark-up: calling an output core function, via the active application, configured to output text associated with the active application;
managing the output text, via the processor core, for display and/or text-to-speech output to the user via the active application, wherein the processor core is a Human Machine Interface-type processor core;
transferring the output text associated with the active application to the content tracker, via the processor core;
wherein the performance of the content mark-up, via the natural language processing engine, includes marking up the output text with context that includes one or more of the following kinds of context: textual topics and/or key words,
wherein maintaining the history of communication interactions, via the content tracker, includes tracking application and/or user communication interactions, and comprises:
tracking a time-type context that provides an indication of the history of communication interactions;
tracking a category-type context that includes one or more of the following kinds of context: application type of the active application, video files, photo files, address book contacts for phone calls, email, social networks, application-specific context, music files, web sites, and/or geographical data;
tracking an environmental-type context that includes one or more of the following kinds of context: time, location, route, activities, phone call-type events, and/or message-type events;
determining a listing of new categories and/or older existing categories based at least in part on the time-type context and the category-type context;
determining a new context filter based at least in part on the environmental-type context;
wherein the updating of the dynamic dictionary, via the dynamic dictionary manager, based at least in part on the maintained history of communication interactions, comprises:
updating the dynamic dictionary by removing words associated with one or more of the domain specific dictionaries based at least in part on the listing of older existing categories; and
updating the dynamic dictionary by accessing one or more of the domain specific dictionaries based at least in part on the listing of new categories, and limiting the scope of words chosen from the accessed domain specific dictionaries to a subset of available words available from the accessed domain specific dictionaries based at least in part on the new context filter.

10. The method of claim 1, further comprising:
wherein the performance of the content mark-up includes marking-up the output subsequent text associated with the voice input with one or more contexts as marked-up speech recognition output,
wherein the updating of the dynamic dictionary further includes updating the dynamic dictionary based at least in part on the content mark-up of the marked-up speech recognition output, and
routing the marked-up speech recognition output, via a processor core, to one or more applications for display and/or text-to-speech output to the user.

11. A system for performing speech recognition on a computer, comprising:
a display device configured to communicate output text to a user from an active application;
one or more processors communicatively coupled to the display device;
one or more memory stores communicatively coupled to the one or more processors;
a natural language processing engine communicatively coupled to the one or more processors and configured to perform a content mark-up of the output, wherein the performance of the content mark-up by the natural language processing engine is done in response to the communication of the output text from the active application to the user even in the absence of receiving voice input and even in the absence of performing speech recognition;
a content tracker configured to maintain a history of communication interactions in response to the content mark-up of the output text associated with the active application, wherein the content tracker is further configured to determine a listing of new words based at least in part on the content mark-up of the output text from the active application previously performed by the natural language processing engine, and wherein the content tracker is further configured to determine a listing of older existing words based at least in part on the content mark-up of the output text from the active application previously performed by the natural language processing engine;
a dynamic dictionary manager configured to update a dynamic dictionary based at least in part on the maintained history of communication interactions, wherein the dynamic dictionary manager is further configured to update the dynamic dictionary by adding new words based at least in part on the listing of new words without accessing one or more domain specific dictionaries, and wherein the dynamic dictionary manager is further configured to update the dynamic dictionary by removing existing words based at least in part on the listing of older existing words without accessing one or more domain specific dictionaries;
an input device configured to receive a voice input from a user; and
a speech recognition engine configured to perform speech recognition on the voice input to output subsequent text associated with the voice input for display via display device and/or text-to-speech output to the user based at least in part on use of the dynamic dictionary;
wherein the system is configured to display output to the user and present text-to-speech output to the user in response to the performed speech recognition based at least in part on use of the dynamic dictionary.

12. The system of claim 11, wherein the content tracker is further configured to track application and/or user communication interactions.

13. The system of claim 11, wherein the content tracker is further configured to track application and/or user communication interactions, and further configured to:
track a time-type context that provides an indication of the history of communication interactions;
track a category-type context that includes one or more of the following kinds of context: application type of the active application, video files, photo files, address book contacts for phone calls, email, social networks, application-specific context, music files, web sites, and/or geographical data;
track an environmental-type context that includes one or more of the following kinds of context: time, location, route, activities, phone call-type events, and/or message-type events;
determine a listing of new categories and/or older existing categories based at least in part on the time-type context and the category-type context; and
determine a new context filter based at least in part on the environmental-type context.

14. The system of claim 11, wherein the dynamic dictionary manager is further configured to update the dynamic dictionary based at least in part on a maintained history of communication interactions, and further configured to:
update the dynamic dictionary by removing words associated with one or more of the domain specific dictionaries based at least in part on a listing of older existing categories; and
update the dynamic dictionary by accessing one or more of the domain specific dictionaries based at least in part on a listing of new categories, and limiting the scope of words chosen from the accessed domain specific dictionaries to a subset of available words available from the accessed domain specific dictionaries based at least in part on a new context filter.

15. The system of claim 11, further comprising:
a processor core configured to: manage the output text associated with the active application for display and/or text-to-speech output to the user via the active application prior to performance of the content mark-up, wherein the processor core is a Human Machine Interface-type processor core; and transfer the output text associated with the active application to the content tracker;
wherein the natural language processing engine is further configured to mark up the output text with context that includes one or more of the following kinds of context: textual topics and/or key words,
wherein the content tracker is further configured to track application and/or user communication interactions, and further configured to:
track a time-type context that provides an indication of the history of communication interactions;
track a category-type context that includes one or more of the following kinds of context: application type of the active application, video files, photo files, address book contacts for phone calls, email, social networks, application-specific context, music files, web sites, and/or geographical data;
track an environmental-type context that includes one or more of the following kinds of context: time, location, route, activities, phone call-type events, and/or message-type events;
determine a listing of new categories and/or older existing categories based at least in part on the time-type context and the category-type context; and
determine a new context filter based at least in part on the environmental-type context;
wherein the dynamic dictionary manager is further configured to update the dynamic dictionary based at least in part on a maintained history of communication interactions, and further configured to:
update the dynamic dictionary by removing words associated with one or more of the domain specific dictionaries based at least in part on the listing of older existing categories; and
update the dynamic dictionary by accessing one or more of the domain specific dictionaries based at least in part on the listing of new categories, and limiting the scope of words chosen from the accessed domain specific dictionaries to a subset of available words available from the accessed domain specific dictionaries based at least in part on the new context filter.

16. The system of claim 11, further comprising:
wherein the performance of the content mark-up includes performance of a mark-up of the output subsequent text associated with the voice input with one or more contexts as marked-up speech recognition output,
wherein the update of the dynamic dictionary further includes an update of the dynamic dictionary based at least in part on the content mark-up of the marked-up speech recognition output, and
a processor core configured to route the marked-up speech recognition output to one or more applications for display and/or text-to-speech output to the user.

17. At least one non-transitory machine readable medium comprising a plurality of instructions that in response to being executed on a computing device, cause the computing device to:
communicate output text to a user from an active application;

perform a content mark-up of the output text, wherein the performance of the content mark-up by the natural language processing engine is done in response to the communication of the output text from the active application to the user even in the absence of receiving voice input and even in the absence of performing speech recognition;

maintain a history of communication interactions in response to the content mark-up of the output text associated with the active application;

determine a listing of new words in response to the content mark-up of the output text from the active application previously performed by the natural language processing engine;

determine a listing of older existing words in response to the content mark-up of the output text from the active application previously performed by the natural language processing engine;

update a dynamic dictionary based at least in part on the maintained history of communication interactions, wherein the update of the dynamic dictionary includes adding new words based at least in part on the listing of new words without accessing one or more domain specific dictionaries, and wherein the update of the dynamic dictionary includes removing existing words based at least in part on the listing of older existing words without accessing one or more domain specific dictionaries;

receive a voice input from a user;

perform speech recognition on the voice input to output subsequent text associated with the voice input for display and/or text-to-speech output to the user based at least in part on use of the dynamic dictionary; and display output to the user and present text-to-speech output to the user in response to the performed speech recognition based at least in part on use of the dynamic dictionary.

18. The non-transitory machine readable medium of claim 17, further comprising instructions that in response to being executed on the computing device, cause the computing device to:

prior to performing the content mark-up: call an output core function, via the active application, to output text associated with the active application;

manage the output text for display and/or text-to-speech output to the user via the active application; and transfer the output text associated with the active application to the content tracker.

19. The non-transitory machine readable medium of claim 17, wherein maintenance of the history of communication interactions includes operations to track application and/or user communication interactions, and comprises operations to:

track a time-type context that provides an indication of the history of communication interactions;

track a category-type context that includes one or more of the following kinds of context: application type of the active application, video files, photo files, address book contacts for phone calls, email, social networks, application-specific context, music files, web sites, and/or geographical data;

track an environmental-type context that includes one or more of the following kinds of context: time, location, route, activities, phone call-type events, and/or message-type events;

determine a listing of new categories and/or older existing categories based at least in part on the time-type context and the category-type context; and determine a new context filter based at least in part on the environmental-type context.

20. The non-transitory machine readable medium of claim 17, wherein the update of the dynamic dictionary is based at least in part on a maintained history of communication interactions, and comprises operations to:

update the dynamic dictionary by removing words associated with one or more of the domain specific dictionaries based at least in part on a listing of older existing categories; and update the dynamic dictionary by accessing one or more of the domain specific dictionaries based at least in part on a listing of new categories, and limiting the scope of words chosen from the accessed domain specific dictionaries to a subset of available words available from the accessed domain specific dictionaries based at least in part on a new context filter.

21. The non-transitory machine readable medium of claim 17, further comprising instructions that in response to being executed on the computing device, cause the computing device to:

prior to performing the content mark-up: call an output core function, via the active application, to output text associated with the active application;

manage the output text for display and/or text-to-speech output to the user via the active application; and transfer the output text associated with the active application to the content tracker wherein the performance of the content mark-up includes operations to mark up the output text with context that includes one or more of the following kinds of context: textual topics and/or key words, wherein maintenance of the history of communication interactions includes operations to track application and/or user communication interactions, and comprises operations to:

track a time-type context that provides an indication of the history of communication interactions;

track a category-type context that includes one or more of the following kinds of context: application type of the active application, video files, photo files, address book contacts for phone calls, email, social networks, application-specific context, music files, web sites, and/or geographical data;

track an environmental-type context that includes one or more of the following kinds of context: time, location, route, activities, phone call-type events, and/or message-type events;

determine a listing of new categories and/or older existing categories based at least in part on the time-type context and the category-type context;

determine a new context filter based at least in part on the environmental-type context;

wherein the update of the dynamic dictionary is based at least in part on a maintained history of communication interactions, and comprises operations to:

update the dynamic dictionary by removing words associated with one or more of the domain specific dictionaries based at least in part on the listing of older existing categories; and update the dynamic dictionary by accessing one or more of the domain specific dictionaries based at least in part on the listing of new categories, and limiting the scope of words chosen from the accessed domain specific dictionaries to a subset of available words available from the accessed domain specific dictionaries based at least in part on the new context filter.

22. The non-transitory machine readable medium of claim 17, further comprising instructions that in response to being executed on the computing device, cause the computing device to:
  mark-up the output subsequent text associated with the voice input with one or more contexts as marked-up speech recognition output,
  update the dynamic dictionary based at least in part on the content mark-up of the marked-up speech recognition output, and
route the marked-up speech recognition output to one or more applications for display and/or text-to-speech output to the user.

* * * * *